US006263387B1

(12) United States Patent
Chrabaszcz

(10) Patent No.: US 6,263,387 B1
(45) Date of Patent: Jul. 17, 2001

(54) SYSTEM FOR AUTOMATICALLY CONFIGURING A SERVER AFTER HOT ADD OF A DEVICE

(75) Inventor: Michael Chrabaszcz, Milpitas, CA (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 08/942,331

(22) Filed: Oct. 1, 1997

(51) Int. Cl.$^7$ ........................................... G06F 13/00
(52) U.S. Cl. ..................... 710/103; 710/8; 713/1; 709/220
(58) Field of Search ........................ 395/281–283, 395/828–830, 651–653; 710/8–10, 101–104; 713/1, 2, 100; 709/220–222

(56) References Cited

U.S. PATENT DOCUMENTS

| 4,057,847 | 11/1977 | Lowell et al. ................. 364/200 |
| 4,100,597 | 7/1978 | Fleming et al. ................ 364/474 |
| 4,449,182 | 5/1984 | Rubinson et al. .............. 364/200 |

(List continued on next page.)

FOREIGN PATENT DOCUMENTS

| 0 866 403 A1 | 9/1998 | (EP) . | |
| 04 333 118 A | 11/1992 | (JP) | G06F/1/18 |
| 05 233 110 A | 9/1993 | (JP) | G06F/3/00 |
| 07 093 064 A | 4/1995 | (JP) | G06F/1/26 |
| 07 261 874 A | 10/1995 | (JP) | G06F/1/18 |

OTHER PUBLICATIONS

Shanley and Anderson, PCI System Architecture, Third Edition, Chapters 15 & 16, pp. 297–328, CR 1995.
PCI Hot–Plug Specification, Preliminary Revision for Review Only, Revision 0.9, pp. i–vi, and 1–25, Mar. 5, 1997.
SES SCSI–3 Enclosure Services, X3T10/Project 1212–D/Rev 8a, pp. i iii–x, 1–76, and l–1 (index), Jan. 16, 1997.
Compaq Computer Corporation, Technology Brief, pp. 1–13, Dec. 1996, "Where Do I Plug the Cable? Solving the Logical–Physical Slot Numbering Problem."
Davis, T, Usenet post to alt.msdos.programmer, Apr. 1997, "Re: How do I create an FDISK batch File?".
Davis, T., Usenet post to alt.msdos.batch, Apr. 1997, "Re: Need help with automating FDISK and Format . . .".
NetFrame Systems Incorporated, Doc. No. 78–100026–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."
Shanley, and Anderson, PCI System Architecture, Third Edition, Chapter 15, pp. 297–302, Copyright 1995, "Intro To Configuration Address Space."
Shanley, and Anderson, PCI System Architecture, Third Edition, Chapter 16, pp. 303–328, Copyright 1995, "Configuration Transactions."
Sun Microsystems Computer Company, Part No. 802–5355–10, Rev. A, May 1996, "Solstice SyMON User's Guid."

(List continued on next page.)

Primary Examiner—Sumati Lefkowitz
(74) Attorney, Agent, or Firm—Knobbe, Martens, Olson & Bear, LLP

(57) ABSTRACT

A system for automatically configuring a computer system, after a device has been hot added to the computer system, which includes the following elements: a detection module which automatically detects a hot added device; a first configuration module which automatically configures the device; an identification module which automatically identifies a device type for the device; a location module which automatically determines the location where the device has been hot added; a driver module which automatically loads a driver corresponding to the hot added device; and a second configuration module which automatically modifies a configuration file so as to integrate the hot added device into the system.

47 Claims, 8 Drawing Sheets

U.S. PATENT DOCUMENTS

| | | | |
|---|---|---|---|
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. . | |
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. . | |
| 4,894,792 | 1/1990 | Mitchell et al. | 364/708 |
| 4,949,245 | 8/1990 | Martin et al. . | |
| 4,999,787 | 3/1991 | McNally et al. . | |
| 5,006,961 | 4/1991 | Monico . | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 | 5/1993 | Bartol . | |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,265,098 | 11/1993 | Mattson et al. | 371/11.1 |
| 5,266,838 | 11/1993 | Gerner | 307/19 |
| 5,269,011 | 12/1993 | Yanai et al. . | |
| 5,272,382 | 12/1993 | Heald et al. | 307/66 |
| 5,272,584 | 12/1993 | Austruy et al. . | |
| 5,276,814 | 1/1994 | Bourke et al. | 395/275 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. . | |
| 5,311,397 | 5/1994 | Harshberger et al. | 361/683 |
| 5,311,451 | 5/1994 | Barrett | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,351,276 | 9/1994 | Doll, Jr. et al. . | |
| 5,367,670 | 11/1994 | Ward et al. | 395/575 |
| 5,379,184 | 1/1995 | Barraza et al. | 361/685 |
| 5,386,567 | 1/1995 | Lien et al. . | |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,423,025 | 6/1995 | Goldman et al. | 395/575 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. . | |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,487,148 | 1/1996 | Komori et al. . | |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. | 395/182.04 |
| 5,513,339 | 4/1996 | Agrawal et al. | 395/500 |
| 5,515,515 | 5/1996 | Kennedy et al. | 395/283 |
| 5,517,646 | 5/1996 | Piccirillo et al. . | |
| 5,519,851 * | 5/1996 | Bender et al. | 710/102 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,535,326 | 7/1996 | Baskey et al. | 395/182.02 |
| 5,542,055 | 7/1996 | Amini et al. | 395/281 |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. . | |
| 5,560,022 | 9/1996 | Dunstan et al. | 395/750 |
| 5,564,024 | 10/1996 | Pemberton . | |
| 5,566,299 | 10/1996 | Billings et al. | 395/182.02 |
| 5,566,339 | 10/1996 | Perholtz et al. | 395/750 |
| 5,568,610 | 10/1996 | Brown . | |
| 5,568,619 | 10/1996 | Blackledge et al. . | |
| 5,572,403 | 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,581,712 | 12/1996 | Herman . | |
| 5,581,714 | 12/1996 | Amini et al. . | |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,588,144 | 12/1996 | Inoue et al. . | |
| 5,592,611 | 1/1997 | Midgely et al. | 395/182.02 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 1/1997 | Brown et al. | 73/9 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. . | |
| 5,636,341 | 6/1997 | Matsushita et al. | 395/182.11 |
| 5,638,289 | 6/1997 | Yamada et al. | 364/489 |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. . | |
| 5,655,083 | 8/1997 | Bagley | 395/182.31 |
| 5,655,148 * | 8/1997 | Richman et al. | 710/8 |
| 5,659,682 | 8/1997 | Devarakonda et al. . | |
| 5,664,118 | 9/1997 | Nishigaki et al. | 395/283 |
| 5,664,119 | 9/1997 | Jeffries et al. . | |
| 5,666,538 | 9/1997 | DeNicola . | |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,675,723 | 10/1997 | Ekrot et al. . | |
| 5,680,288 | 10/1997 | Carey et al. . | |

| | | | | | | |
|---|---|---|---|---|---|---|
| 5,684,671 | 11/1997 | Hobbs et al. . | | 5,802,298 | 9/1998 | Imai et al. ............... 398/200.47 |
| 5,689,637 | 11/1997 | Johnson et al. . | | 5,802,305 | 9/1998 | McKaughan et al. ........ 395/200.57 |
| 5,696,895 | 12/1997 | Hemphill et al. ............ 395/182.02 | | 5,802,324 | 9/1998 | Wunderlich et al. ............. 395/281 |
| 5,696,899 | 12/1997 | Kalwitz . | | 5,802,393 | 9/1998 | Begun et al. . |
| 5,696,949 | 12/1997 | Young ............................... 395/551 | | 5,802,552 | 9/1998 | Fandrich et al. . |
| 5,696,970 | 12/1997 | Sandage et al. . | | 5,802,592 | 9/1998 | Chess et al. ....................... 711/164 |
| 5,701,417 | 12/1997 | Lewis et al. ................... 395/200.16 | | 5,803,357 | 9/1998 | Lakin ............................... 236/78 B |
| 5,704,031 | 12/1997 | Mikami et al. ................ 395/182.02 | | 5,805,804 | 9/1998 | Laursen et al. ................ 395/200.02 |
| 5,708,775 | 1/1998 | Nakamura ...................... 395/185.01 | | 5,805,834 | 9/1998 | McKinley et al. . |
| 5,708,776 | 1/1998 | Kikinis ........................... 395/185.08 | | 5,809,224 | 9/1998 | Schultz et al. . |
| 5,712,754 | 1/1998 | Sides et al. ........................ 361/58 | | 5,809,256 | 9/1998 | Najemy ............................. 395/283 |
| 5,715,456 | 2/1998 | Bennett et al. .................... 395/652 | | 5,809,287 | 9/1998 | Stupek, Jr. et al. ................ 395/500 |
| 5,717,570 | 2/1998 | Kikinis ............................... 361/685 | | 5,809,555 | 9/1998 | Hobson .............................. 711/172 |
| 5,721,935 | 2/1998 | DeSchepper et al. ............ 395/750 | | 5,812,748 | 9/1998 | Ohran et al. .................... 395/182.02 |
| 5,724,529 | 3/1998 | Smith et al. . | | 5,812,750 | 9/1998 | Dev et al. . |
| 5,726,506 | 3/1998 | Wood . | | 5,812,757 | 9/1998 | Okamoto et al. . |
| 5,727,207 | 3/1998 | Gates et al. ........................ 395/651 | | 5,812,858 | 9/1998 | Nookala et al. . |
| 5,732,266 | 3/1998 | Moore et al. ...................... 395/651 | | 5,815,117 | 9/1998 | Kolanek . |
| 5,737,708 | 4/1998 | Grob et al. ........................ 455/557 | | 5,815,647 | 9/1998 | Buckland et al. ............. 398/182.01 |
| 5,740,378 | 4/1998 | Rehl et al. . | | 5,815,652 | 9/1998 | Ote et al. . |
| 5,742,514 | 4/1998 | Bonola ............................... 364/492 | | 5,821,596 | 10/1998 | Miu et al. ........................... 257/419 |
| 5,742,833 | 4/1998 | Dea et al. ...................... 395/750.05 | | 5,822,547 | 10/1998 | Boesch et al. . |
| 5,747,889 | 5/1998 | Raynham et al. . | | 5,826,043 | 10/1998 | Smith et al. ....................... 395/281 |
| 5,748,426 | 5/1998 | Bedingfield et al. . | | 5,829,311 | 9/1998 | Jones ............................. 398/750.11 |
| 5,752,164 | 5/1998 | Jones ................................. 455/33.1 | | 5,835,719 | 11/1998 | Gibson et al. ................. 395/200.51 |
| 5,754,396 | 5/1998 | Felcman et al. ................... 361/683 | | 5,835,738 | 11/1998 | Blackledge, Jr. et al. . |
| 5,754,449 | 5/1998 | Hoshal et al. ..................... 364/550 | | 5,838,932 | 11/1998 | Alzien ................................ 395/308 |
| 5,754,797 | 5/1998 | Takahashi . | | 5,841,964 | 11/1998 | Yamaguchi .................... 395/113.21 |
| 5,758,165 | 5/1998 | Shuff ................................... 395/712 | | 5,841,991 | 11/1998 | Russell . |
| 5,758,352 | 5/1998 | Reynolds et al. .................. 707/200 | | 5,845,061 | 12/1998 | Miyamoto et al. ........... 395/182.02 |
| 5,761,033 | 6/1998 | Wilhelm . | | 5,845,095 | 12/1998 | Reed et al. ........................ 395/283 |
| 5,761,045 | 6/1998 | Olson et al. . | | 5,850,546 | 12/1998 | Kim ................................... 395/651 |
| 5,761,085 | 6/1998 | Giorgio ............................... 364/505 | | 5,852,720 | 12/1998 | Gready et al. . |
| 5,761,462 | 6/1998 | Neal et al. . | | 5,852,724 | 12/1998 | Glenn, II et al. .............. 395/200.69 |
| 5,761,707 | 6/1998 | Aiken et al. ....................... 711/118 | | 5,857,074 | 1/1999 | Johnson . |
| 5,764,924 | 6/1998 | Hong .................................. 395/281 | | 5,857,102 | 1/1999 | McChesney et al. .............. 395/653 |
| 5,764,968 | 6/1998 | Ninomiya . | | 5,864,653 | 1/1999 | Tavallaei et al. .................. 315/181 |
| 5,765,008 | 6/1998 | Desai et al. . | | 5,864,713 | 1/1999 | Terry ................................. 395/872 |
| 5,765,198 | 6/1998 | McCrocklin et al. . | | 5,867,730 | 2/1999 | Leyda ................................ 395/830 |
| 5,767,844 | 6/1998 | Stoye ................................. 345/212 | | 5,875,307 | 2/1999 | Ma et al. ........................... 395/281 |
| 5,768,541 | 6/1998 | Pan-Ratzlaff . | | 5,875,308 | 2/1999 | Egan et al. ......................... 395/283 |
| 5,768,542 | 6/1998 | Enstrom et al. . | | 5,875,310 | 2/1999 | Buckland et al. .................. 395/306 |
| 5,771,343 | 6/1998 | Hafner et al. .................. 395/182.02 | | 5,878,237 | 3/1999 | Olarig ................................ 395/308 |
| 5,774,645 | 6/1998 | Beaujard et al. .............. 395/183.01 | | 5,878,238 | 3/1999 | Gan et al. .......................... 395/308 |
| 5,774,741 | 6/1998 | Choi . | | 5,881,311 | 3/1999 | Woods ............................... 395/824 |
| 5,777,897 | 7/1998 | Giorgio ............................... 364/557 | | 5,884,027 | 3/1999 | Garbus et al. ................... 395/200.8 |
| 5,778,197 | 7/1998 | Dunham ............................. 395/284 | | 5,884,049 | 3/1999 | Atkinson ........................... 395/281 |
| 5,781,703 | 7/1998 | Desai et al. . | | 5,886,424 | 3/1999 | Kim ..................................... 307/64 |
| 5,781,716 | 7/1998 | Hemphill et al. ............. 395/182.02 | | 5,889,965 | 3/1999 | Wallach et al. .................... 395/283 |
| 5,781,744 | 7/1998 | Johnson et al. .................... 395/283 | | 5,892,898 | 4/1999 | Fujii et al. ....................... 395/185.1 |
| 5,781,767 | 7/1998 | Inoue et al. . | | 5,892,928 | 4/1999 | Wallach et al. .................... 395/283 |
| 5,781,798 | 7/1998 | Beatty et al. . | | 5,898,846 | 4/1999 | Kelley ............................... 395/284 |
| 5,784,555 | 7/1998 | Stone ............................... 395/200.5 | | 5,898,888 | 4/1999 | Guthrie et al. ..................... 395/308 |
| 5,784,576 | 7/1998 | Guthrie et al. . | | 5,905,867 | 5/1999 | Giorgio .......................... 395/200.54 |
| 5,787,019 | 7/1998 | Knight et al. ...................... 364/550 | | 5,907,672 | 5/1999 | Matze et al. .................... 395/182.06 |
| 5,787,459 | 7/1998 | Stallmo et al. ..................... 711/112 | | 5,909,568 | 6/1999 | Nason ................................ 395/500 |
| 5,787,491 | 7/1998 | Merkin et al. ..................... 711/173 | | 5,911,779 | 6/1999 | Stallmo et al. ......................... 714/6 |
| 5,790,775 | 8/1998 | Marks et al. ................... 395/182.07 | | 5,913,034 | 6/1999 | Malcolm ........................ 395/200.53 |
| 5,790,831 | 8/1998 | Lin et al. . | | 5,922,060 | 7/1999 | Goodrum ........................... 710/103 |
| 5,793,948 | 8/1998 | Asahi et al. ..................... 395/184.01 | | 5,930,358 | 7/1999 | Rao ......................................... 380/4 |
| 5,793,987 | 8/1998 | Quackenbush et al. . | | 5,935,262 | 8/1999 | Barrett et al. ........................ 714/46 |
| 5,794,035 | 8/1998 | Golub et al. . | | 5,936,960 | 8/1999 | Stewart .............................. 370/438 |
| 5,796,185 | 8/1998 | Takata et al. . | | 5,938,751 | 8/1999 | Tavallaei et al. ................... 710/103 |
| 5,796,580 | 8/1998 | Komatsu et al. ................... 361/687 | | 5,941,996 | 8/1999 | Smith et al. ......................... 714/47 |
| 5,796,981 | 8/1998 | Abudayyeh et al. . | | 5,964,855 | 10/1999 | Bass et al. ......................... 710/103 |
| 5,797,023 | 8/1998 | Berman et al. ............... 395/750.06 | | 5,983,349 | 11/1999 | Kodama et al. ................... 713/200 |
| 5,798,828 | 8/1998 | Thomas et al. . | | 5,987,554 | 11/1999 | Liu et al. ........................... 710/129 |
| 5,799,036 | 8/1998 | Staples . | | 5,987,627 | 11/1999 | Rawlings, III ...................... 714/48 |
| 5,799,196 | 8/1998 | Flannery ......................... 395/750.03 | | 6,012,130 | 1/2000 | Beyda et al. ....................... 711/173 |
| 5,801,921 | 9/1998 | Miller . | | 6,038,624 | 3/2000 | Chan et al. ........................ 710/103 |
| 5,802,269 | 9/1998 | Poisner et al. . | | | | |

OTHER PUBLICATIONS

Sun Microsystems, Part No. 802–6569–11, Release 1.0.1, Nov. 1996, "Remote Systems Diagnostics Installation & User Guide."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulliten, 92A+62947, pp. 391–394, Oct. 1992, Method for Card Hot Plug Detection and Control.

Shanley, and Anderson, PCI System Architecture, Third Edition, p. 382, Copyright 1995.

ftp.cdrom.com/pub/os2diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe–support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

PCI Bus Hot Plug Specification dated Jun. 15, 1997.

Supporting Removable Devices Under Windows and Windows NT; updated Aug. 13, 1997.

Plug and Play BIOS Specification dated May 5, 1994.

Lyon, Daniel, Computer Reseller News, ACC releases low--cost solution for ISPs Feb. 3, 1997.*

Noell IntranetWare supports hot pluggable PCI from Net-FRAME, Dec. 19, 1996.*

Rigney, Steve, PC Magazine, The one for the road, Oct. 10, 1995.*

* cited by examiner

SYSTEM FOR AUTOMATICALLY CONFIGURING A SERVER AFTER HOT ADD OF A DEVICE

RELATED APPLICATIONS

This application is related to U.S. patent application Ser. No.: 08/942,319, entitled, "Method For Automatically Configuring a Server After Hot Add of A Device," which is commonly owned and filed concurrently herewith.

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to reducing down-time in computer systems. More particularly, the invention relates to a method and system for adding and/or replacing a device in a file server computer, without having to power down the server computer, and automatically configuring the server computer so as to integrate the device into the server system.

2. Description of the Related Technology

In the computer industry, the reduction of computer failures and computer "downtime" is a major focus for companies trying to achieve a competitive edge over their competitors. The reduction of downtime due to system failures and maintenance is critical to providing quality performance and product reliability to the users and buyers of computer systems. Particularly with respect to server computers which are accessed and utilized by many end users, the reduction of server downtime is an extremely desirable performance characteristic. This is especially true for users who depend on the server to obtain data and information in their daily business operations.

As servers become more powerful, they are also becoming more sophisticated and complex. A server is typically a central computer in a computer network which manages common data that may be accessed by other computers, otherwise known as "workstations," in the network. Server downtime, resulting from hardware or software faults or from repair and maintenance, continues to be a significant problem today. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

While early detection and correction of system faults is an important element of an overall high reliability architecture, it is only one piece of the puzzle. Studies show that a significant percentage of network server downtime is due to repair and/or maintenance of the server system, in which defective hardware components must be replaced or new components must be added to upgrade the system. Typical prior art methods for replacing and/or adding new devices, such as a PCI adapter card, for example, involve powering down the entire server, locating the port where the device needs to be replaced or added, replacing or adding the device, powering up the server system, configuring the device, and thereafter, configuring the system so as to permanently integrate the device into the system. The process of configuring the system involves loading appropriate drivers, modifying start-up files, and establishing communication protocols, as necessary, such that the new device is recognized and initialized upon subsequent reboots of the system. This process is tedious and time-consuming and can result in hours of server downtime depending on the nature of the changes made to the server system. Additionally, this manual, human-centered approach often results in configuration errors which further adds to server downtime.

One method of replacing and/or adding devices in a computer system, without first powering down the system, is known as "Hot Plug", otherwise known as "Hot Swap and Add". In this method and system, in order to replace an old adapter card with a new one, or add a new adapter card to the system, only a particular slot in which a new or replacement adapter is to be inserted is powered down, while the remaining slots, components, devices, and subsystems of the server remain operational. Therefore, server operation and service to existing customers is not disrupted. One method and system of hot adding devices in a server system is described in further detail in a co-pending and commonly owned U.S. patent application Ser. No. 08/942,309, entitled "Hot Add of Devices Software Architecture," which is listed in Appendix A attached hereto.

In another embodiment of the hot plug method and system, a "canister", connected to a PCI bus of the server system, is powered down, rather than powering down the entire server. Canisters are detachable housing modules which interface with a main system board and a "backplane" board in the server system. These canisters can typically house up to four adapter cards, which may be inserted into bus slots within each canister. Each adapter card is capable of communicating to a system device, such as a CD ROM drive. The structure and functionality of a canister allows a server system to be easily upgraded in capacity or repaired by allowing easy adding and swapping of adapter cards into the bus slots within each canister. The structure and functionality of the canister is described in further detail in a co-pending and commonly owned U.S. patent application Ser. No. 08/942,194, entitled "Fault Tolerant Computer System," which is listed in Appendix A attached hereto.

As used herein, the term "device", "adapter card" or "adapter" are used synonymously and interchangeably and may refer to any electronic element, component, subsystem, or circuit that may be coupled to a bus system of the server and which may be programmed or configured to communicate data to one or more other entities in the server system. Additionally, as used herein, the term "module" refers to any software program, subprogram, subroutine of a program, or software code capable of performing a specified function.

In the hot plug methods and system discussed above, after an adapter has been hot added to the server system, the adapter must be configured in order to communicate with other devices in the server in accordance with a specified communication protocol. The adapter configuration process includes updating a configuration space within the adapter with a configuration manager program and programming the adapter's registers with appropriate memory, I/O and interrupt parameters, after power to the adapter has been turned on. A method for performing this adapter configuration process is described in further detail in a co-pending and commonly owned U.S. patent application Ser. No. 08/941, 268, entitled, "Configuration Management Method For Hot Adding and Hot Replacing Devices," which is listed in Appendix A attached hereto.

However, after the configuration of the adapter is completed, the process does not end there. A system operator must still reconfigure the server system in order to permanently incorporate the new adapter into the system such that it is initialized upon subsequent reboots of the system. Prior art methods of reconfiguring the server, after a new device has been added to the system, typically require a system operator to manually select and load an appropriate driver for the newly added device, and thereafter, modify start-up configuration files by retrieving the files and inputting appropriate configuration parameters corresponding to the newly added device. If the new device is a LAN card, for example, an additional step of "binding the network protocol" of the device must be performed. The term "binding the network protocol", and its meaning, is well-known in the art. This prior art configuration process can be time-consuming and tedious, especially for a system operator who is not familiar with the configuration requirements of the server as well as the newly added device. In such circumstances, the system operator often makes mistakes in performing one or more of the configuration steps. These mistakes may lead to serious errors in server operation and result in additional downtime of the server.

A related technology, not to be confused with hot plug systems, is Plug and Play defined by Microsoft and personal computer (PC) product vendors. Plug and Play is an architecture that facilitates the integration of PC hardware devices to systems that are not powered. Plug and Play devices are able to identify themselves to the computer system after the user installs the device on the bus. Plug and Play devices are also able to identify the hardware resources that they need for operation. Once this information is supplied to the operating system, the operating system can load the device drivers for the device that the user had added while the system was in a non-powered state.

However, plug and play is not designed for hot add applications in server systems. Rather, plug and play devices are typically inserted into a PC when the PC is turned off. Plug and Play does not provide a method of automatically detecting newly added devices while the system is in a constant powered state and thereafter automatically configuring the system so as to permanently integrate the newly hot added device into the system. Plug and Play performs configuration functions only after a device has been inserted into a computer that is powered off and subsequently powered on.

Therefore, a method and system is needed which can not only provide hot pluggability in a server system, but which can also automatically reconfigure the server system so as to integrate hot added devices into the server system, without disrupting system operations and service to existing users. Additionally, there is a need to further reduce server downtime by reducing configuration errors commonly made by prior art manual, human-centered approaches to configuring the server after new devices have been added to the system.

SUMMARY OF THE INVENTION

The invention addresses the above and other needs by providing a method and system in which a server system is automatically reconfigured after a hot add of a device into the server system so as to integrate the hot added device into the system such that it is recognized and initialized upon subsequent reboots of the server system.

In one embodiment of the invention, a system for automatically configuring a computer system, includes: a detection module which automatically detects a hot added device; a first configuration module which automatically configures the device; an identification module which automatically identifies a device type for the device; a location module which automatically determines the location where the device has been hot added; a driver module which automatically loads a driver corresponding to the hot added device; and a second configuration module which automatically modifies a configuration file so as to integrate the hot added device into the system.

In another embodiment, a system of automatically configuring a server system after a device has been hot added to the system, includes: a first scanning module which scans a system bus in order to identify all devices connected to the bus; a compare module which compares a list of identified devices to a configuration database, wherein a new device is indicated if it is identified in the list but not in the configuration database; a first configuration module which configures the device; a vendor module which retrieves a Device ID and Vendor ID from the device so as to identify the type of device; a second scanning module which scans the system bus for any devices which have a hardware instance number (HIN); a HIN module which obtains a hardware instance number (HIN) from the hot added device; a recording module which records a slot number and the hardware instance number of the device; a driver module which loads a driver corresponding to the hot added device; a LAN module which determines whether the hot added device is local area network (LAN) device; and a second configuration module which modifies a configuration file, wherein, if it is determined that the hot added device is not a LAN device, a first configuration file is modified, and if it is determined that the hot added device is a LAN device, a second configuration file is modified.

In a further embodiment, a system for automatically configuring a computer system, includes: means for automatically detecting the hot added device; means for automatically configuring the device; means for automatically identifying the type of device; means for automatically determining the location where the device has been hot added; means for automatically loading a driver corresponding to the hot added device; and means for automatically modifying a configuration file so as to integrate the hot added device into the system.

In a further embodiment, a system of automatically configuring a server system after a device has been hot added to the system, comprising: means for scanning a system bus in order to identify all devices connected to the bus; means for comparing a list of identified devices to a configuration database, wherein a new device is indicated if it is identified in the list but not in the configuration database; means for configuring the device; means for retrieving a Device ID and Vendor ID from the device so as to identify a device type; means for scanning the system bus for any devices which have a hardware instance number (HIN); means for obtaining a hardware instance number (HIN) from the hot added device; means for recording a slot number and the hardware instance number of the device; means for loading a driver corresponding to the hot added device; means for determining whether the hot added device is local area network (LAN) device; and means for configuring the server so as to integrate the hot added device into the server system, wherein if it is determined that the hot added device is not a LAN device, a first configuration file is modified, and if it is determined that the hot added device is a LAN device, a second configuration file is modified.

In another embodiment, a program storage device which stores instructions that when executed by a computer perform a method which includes the acts of: automatically detecting the hot added device; automatically configuring the device; automatically identifying a device type for the device; automatically determining the location where the device has been hot added; automatically loading a driver corresponding to the hot added device; and automatically modifying a configuration file so as to integrate the hot added device into the system.

In yet a further embodiment, the invention provides a program storage device which stores instructions that when executed by a computer perform a method of automatically configuring a server system after a device has been hot added to the system, wherein the method includes: scanning a system bus in order to identify all devices connected to the bus; comparing a list of identified devices to a configuration database, wherein a new device is indicated if it is identified in the list but not in the configuration database; configuring the device; retrieving a Device ID and Vendor ID from the device so as to identify the type of device; scanning the system bus for any devices which have a hardware instance number (HIN); obtaining a hardware instance number (HIN) from the hot added device; recording a slot number and the hardware instance number of the device; loading a driver corresponding to the hot added device; determining whether the hot added device is local area network (LAN) device; if it is determined that the hot added device is not a LAN device, modifying a first configuration file; and if it is determined that the hot added device is a LAN device, binding a network protocol of the device and modifying a second configuration file.

DETAILED DESCRIPTION OF THE INVENTION

The invention is described in detail below with reference to the figures, wherein like parts are referenced with like numerals throughout.

Figure 1:
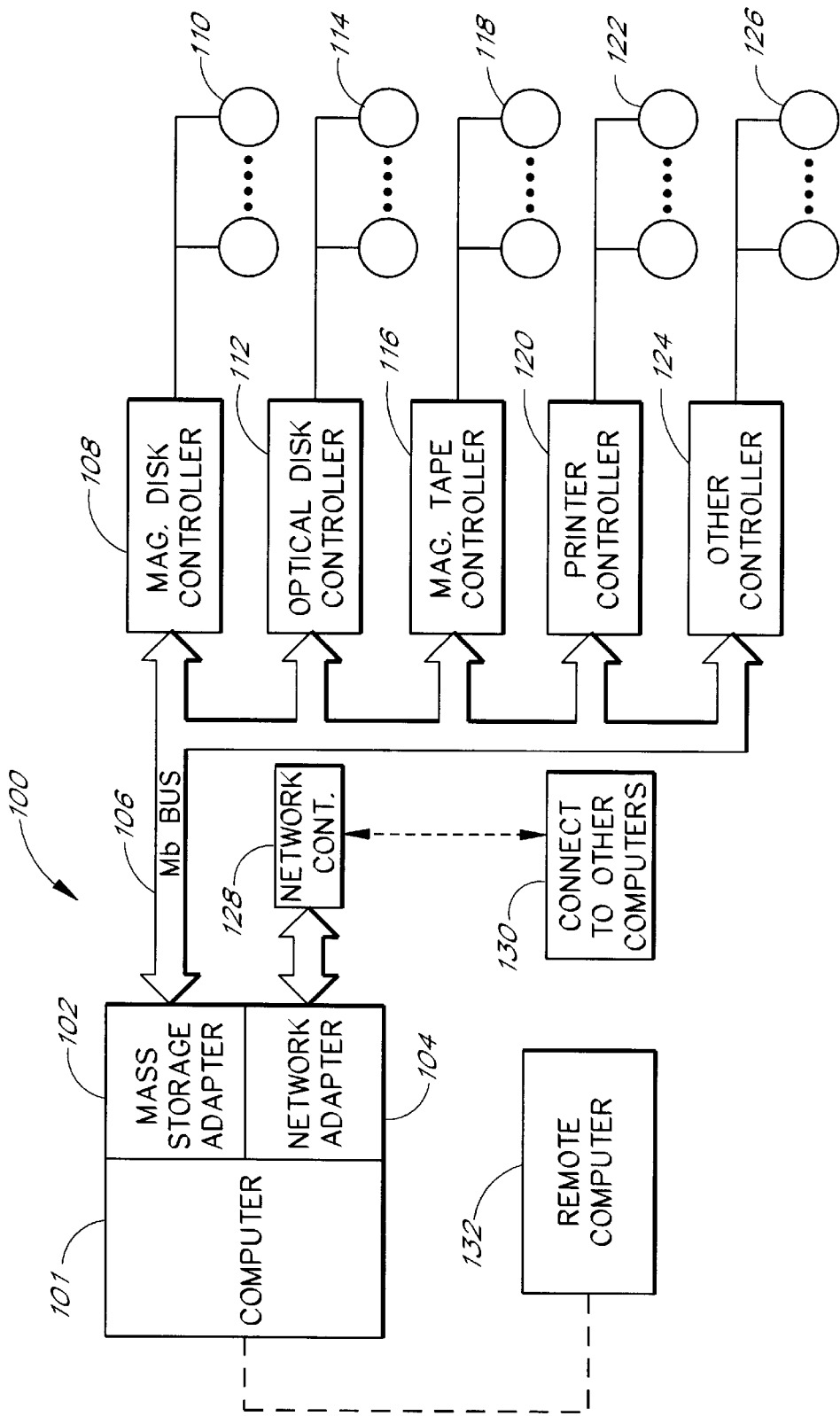
FIG. 1 is a top level block diagram of a fileserver computer system in which hot pluggability and automatic configuration may be implemented, in accordance with one embodiment the invention.

FIG. 1 is a block diagram of one embodiment of a server system 100 in which hot pluggability and automatic configuration may be implemented. Typically, a server plays the role of a central computer in a computer network which manages a central database. This central database is accessed by multiple client computers, otherwise known as "workstations," connected to the computer network. The server system 100 includes a computer 101 connected to a mass storage adapter 102 and a network adapter 104. The network adapter 104 may be a Local Area Network (LAN) card, for example, which is well-known in the art. The mass storage adapter 102 may interface with one or more various types of device controllers: a magnetic disk controller 108 for magnetic disks 110, an optical disk controller 112 for optical disks 114, a magnetic tape controller 116 for magnetic tapes 118, a printer controller 120 for various printers 122, and any other type of controller 124 for other devices 126.

The peripheral devices communicate and are connected to the adapter 102 by a mass storage bus 106. In one embodiment, the bus 106 is a Small Computer System Interface (SCSI) bus. In a typical server configuration there is more than one mass storage adapter. The adapters and devices mentioned above may be off-the-shelf products. For instance, sample vendors for a magnetic disk controller 108 and magnetic disks 110 include Qlogic and Adaptec. Each magnetic hard disk may hold multiple Gigabytes of data.

The network adapter 104 typically includes a network controller 128. The network adapter 104, also sometimes referred to as a network interface card (NIC), allows digital communication between the server system 100 and other computers (not shown) such as a network of servers and workstations via a connection 130. For LAN embodiments of the network adapter, the protocol used may be, for example, Ethernet, token ring, Fiber Distributed Datalink Interface (FDDI) or Asynchronous Transfer Mode (ATM). Typically, the mass storage adapter 102 and the network adapter 104 are connected to the computer using a standards-based bus system such as those provided by Peripheral Component Interconnect (PCI), Microchannel, SCSI, Industrial Standard Architecture (ISA) and Extended ISA (EISA) architectures.

Figure 2:
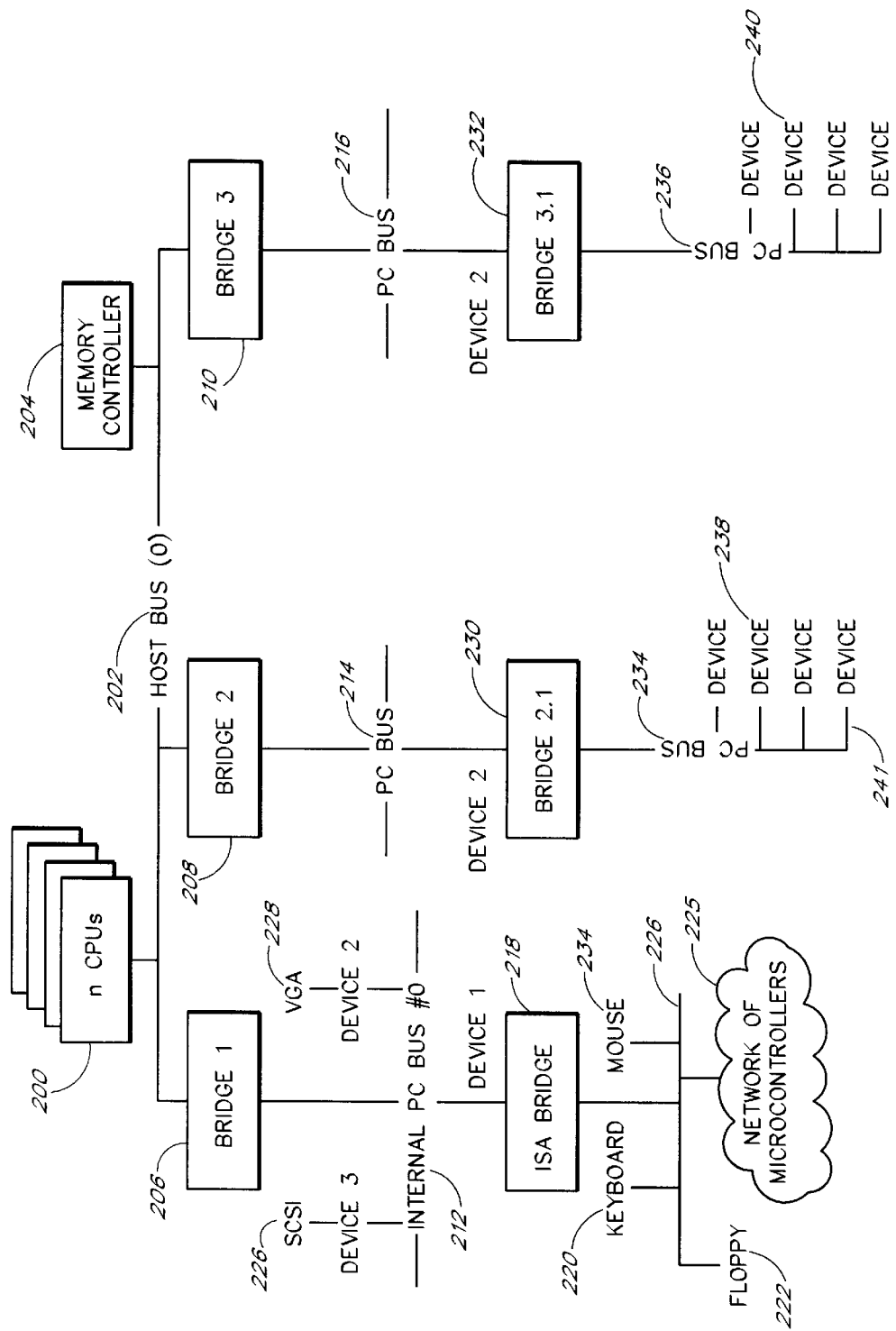
FIG. 2 is a block diagram of one embodiment of a multiple bus architecture for the server system of FIG. 1.

FIG. 2 shows one embodiment of the bus structure of the server system 100 of FIG. 1. A number of central processing units (CPUs) 200 are connected through a host bus 202 to a memory controller 204, which allows for access to semiconductor memory by the other system components. In one embodiment, there are four CPUs 200, each being an Intel Pentium microprocessor. A number of bridges 206, 208 and 210 connect the host bus to three additional bus systems 212, 214, and 216. The bus systems 212, 214 and 216, referred to as PC buses, may be any standards-based bus system such as PCI, ISA, EISA and Microchannel. In one embodiment, the bus system 212 is a peripheral component interface (PCI) bus. An ISA Bridge 218 is connected to the bus system 212 to support legacy devices such as a keyboard, one or more floppy disk drives and a mouse. A network of microcontrollers 225 is also interfaced to the ISA bus 226 to monitor and diagnose the environmental health of the server system. A more detailed description of the microcontroller network 225 is contained in a copending commonly owned U.S. patent application Ser. No. 08/942,402, entitled "Diagnostic and Managing Distributed Processor System", which is listed in Appendix A attached hereto.

A bridge 230 and a bridge 232 connect, respectively, the PC bus 214 with PC bus 234 and the PC bus 216 with the PC bus 236 to provide expansion slots for peripheral devices or adapters. Separating the devices 238 and 240, respectively, on PC buses 234 and 236 eliminates the potential that an adapter driver (not shown) or other transient I/O error will bring the entire system down or stop the system administrator from communicating with the system. The adapter devices 238 and 240 are electrically and mechanically connected to the PC Buses 234 and 236 by PC slots 241. Hence, an adapter is "plugged" into a slot. In one embodiment each slot may be independently powered on and off.

Figure 3:
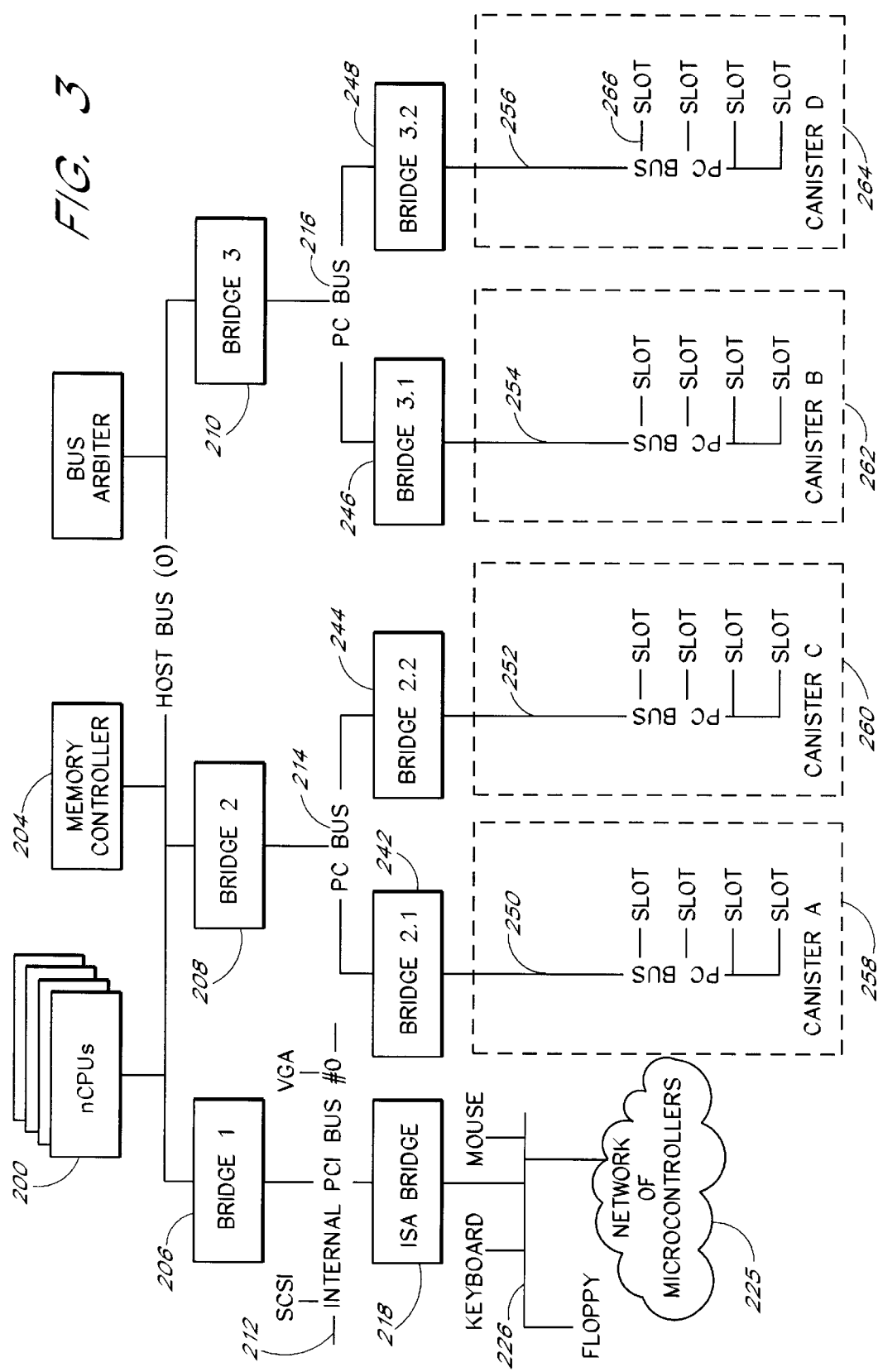
FIG. 3 is a block diagram of an alternative embodiment of a multiple bus computer architecture for the server system of FIG. 1.

FIG. 3 shows an alternative bus structure embodiment of the server system 100 of FIG. 1. The two PC buses 214 and 216 contain a set of bridges 242–248 to a set of PC bus systems 250–256. As with the PC buses 214 and 216, the PC buses 250–256 can be designed according to any type of bus architecture including PCI, ISA, EISA, and Microchannel. The PC buses 250–256 are connected, respectively, to canisters 258, 260, 262 and 264. As discussed above, the canisters 258–264 are housings for a detachable bus system and provide multiple PC slots 266 for additional adapters to be integrated into the system 100. In one embodiment, each canister may be independently powered on and off.

Figure 4:
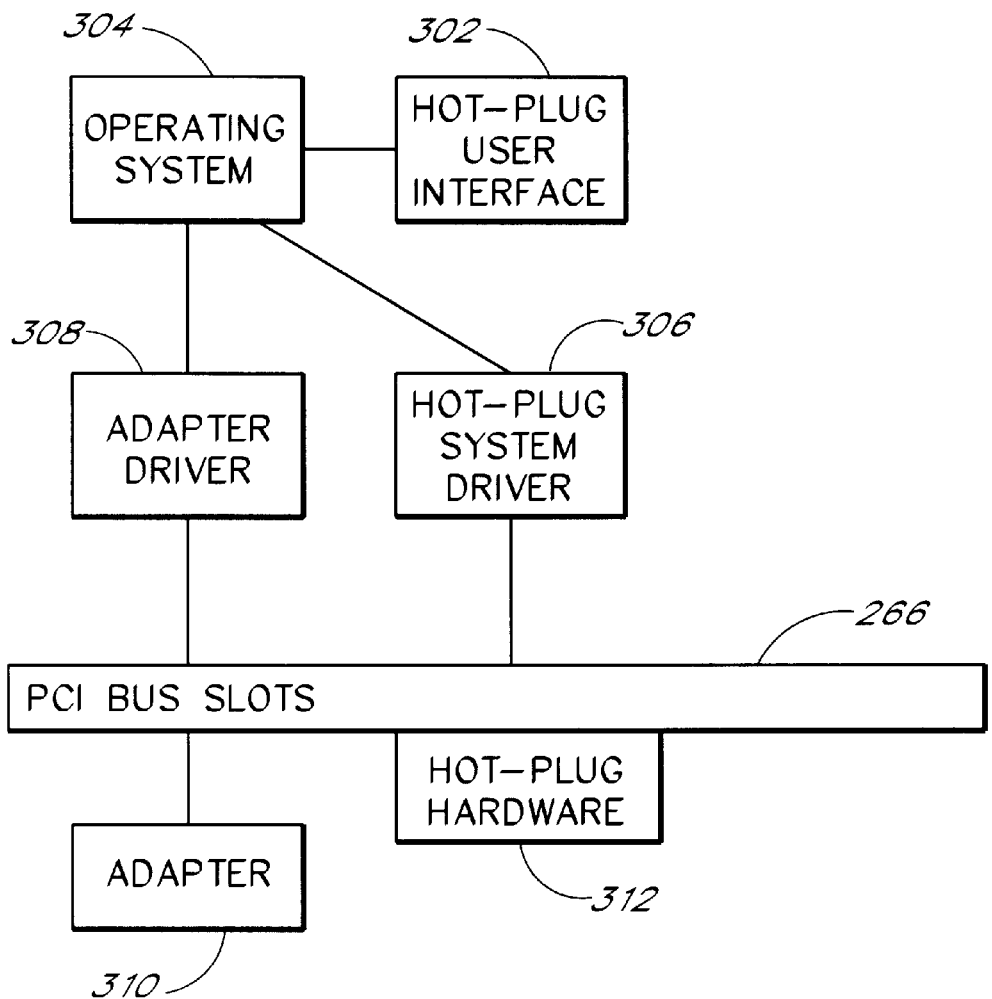
FIG. 4 is a block diagram illustrating some of the subsystems of the server system of FIG. 1.

FIG. 4 is a block diagram illustrating hardware and software components of the server system 100 relating to hot plugging an adapter. A hot plug user interface 302 accepts requests by a user such as a system manager or administrator to perform the hot add or a hot swap of an adapter 310. The user interface 302 preferably communicates through an industry standard operating system 304 such as Windows NT or NetWare, to the hot plug system driver 306 and an adapter driver 308.

The hot plug system driver 306 controls the adapter driver 308 for a hot plug operation. The hot plug system driver 306 stops and resumes the communications between the adapter 310 and the adapter driver 308. During a hot add or swap of the adapter 310, the hot plug hardware 312 deactivates the power to the PC slots 266. One embodiment of the hot plug hardware 312 may include the network of microcontrollers 225 (FIGS. 2 and 3) to carry out this functionality.

The adapter 310 could be any type of peripheral device such as a network adapter, a mass storage adapter, a VGA adapter, a math co-processor, or a sound board. The adapter 310 is physically connected to the hot plug hardware by PC slots such as slots 266.

Figure 6:
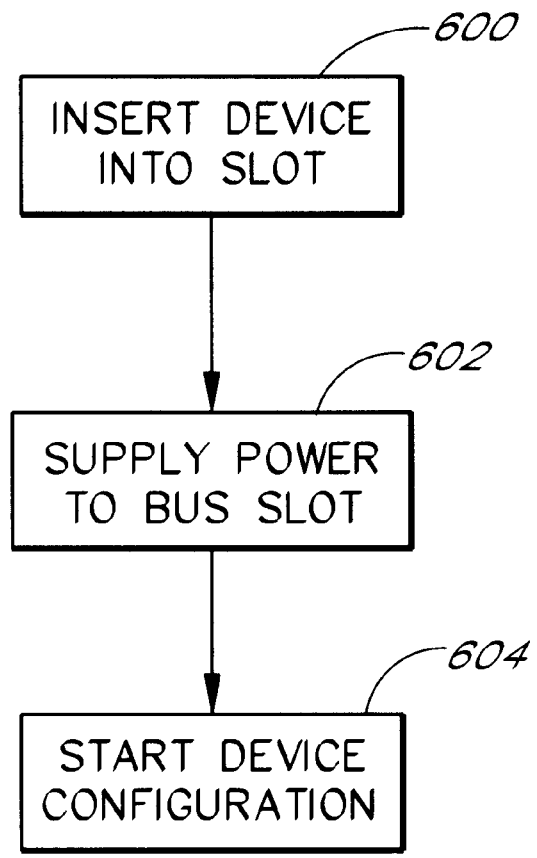
FIG. 6 is a flowchart diagram illustrating one embodiment of a process by which a user performs a hot add of a device into a slot of the server computer of FIG. 1.
Figure 7:
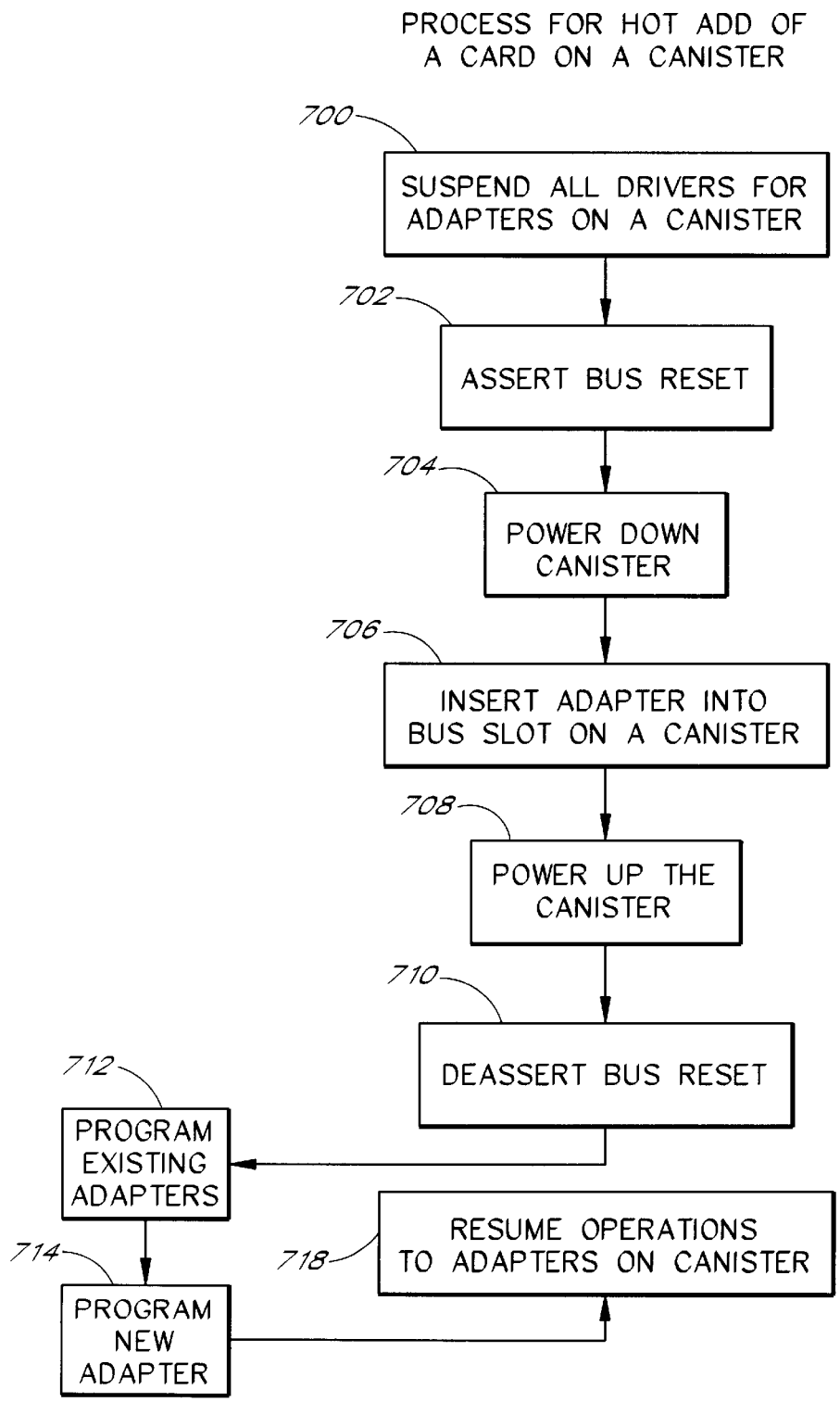
FIG. 7 is a flowchart diagram showing one process by which a user performs a hot add of a card into a canister on the server computer of FIG. 1.

Alternative embodiments of the server system may use other commercial operating systems, such as Macintosh O.S., OS/2, VMS, DOS, Windows® 3.1/95/98 or UNIX to support hot add and swap. The following sections describe hot pluggability under both a NetWare Operating System and WinNT operating system. FIGS. 6 and 7 illustrate one embodiment of a generic process by which these operating systems can perform the hot add of devices. The process for hot add of an adapter under the NetWare Operating System is described with reference to FIGS. 6 and 7.

Adapter Hot Add with NetWare Operating System Implementation

Figure 5:
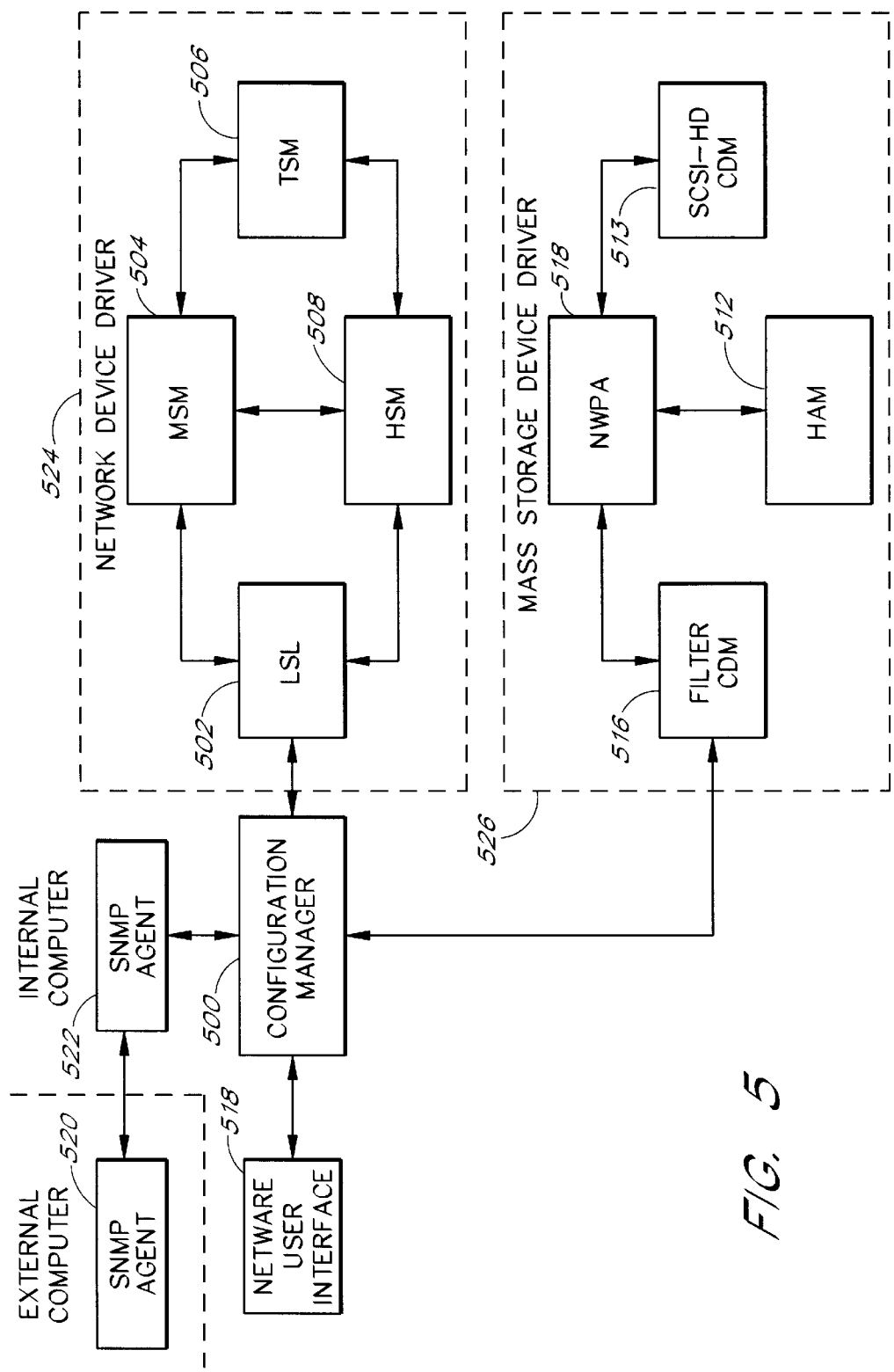
FIG. 5 is a block diagram illustrating components of Novell NetWare's Operating System and one embodiment of a configuration manager which both reside within the server computer of FIG. 1.

FIG. 5 is a block diagram illustrating the system components of a NetWare Operating System and an embodiment of the software components of a hot add program. A configuration manager 500 is responsible for managing all of the adapters on the PC buses 234 and 236 (FIG. 2), or 250, 252, 254 and 256 (FIG. 3). The configuration manager 500 keeps track of the configuration information for every adapter located on the server system 100. The configuration manager 500 also allocates resources for every adapter and initializes each adapter's registers during a hot add operation. The registers of an adapter 310 are components or intermediate memories whose values control a certain action in the adapter, or whose values indicate the status of the adapter.

Novell has created two interfaces for adapter drivers to communicate with the Netware Operating Systems (FIGS. 1 and 4). First, Novell has provided the Open Datalink Interface (ODI) for network drivers. Second, Novell has created the Netware Peripheral Architecture (NWPA) for mass storage adapters. Each of these interfaces is described below.

With respect to network device drivers, such as a driver 524, ODI was created to allow multiple LAN adapters, such as the adapter 104 to co-exist on network systems. The ODI specification describes the set of interface (FIG. 1) and software modules used by hardware vendors to interface with the NetWare operating system. At the core of the ODI is the link support layer (LSL) 502. The LSL 502 is the interface between drivers and protocol stacks (not shown). Any LAN driver written to ODI specifications can communicate with any ODI protocol stack via the LSL 502. A protocol stack is a layered communication architecture, whereby each layer has a well defined interface.

Novell has provided a set of support modules that provide the interface to the LSL 502. These modules are a collection of procedures, macros and structures. These modules are the media support module (MSM) 504 which contains general functions common to all drivers and the topology specific modules (TSM) 506 which provide support for the standardized media types of token ring, Fiber Distributed Datalink Interface (FDDI) and Ethernet. The MSM 504 manages the details of interfacing ODI multi-link interface drivers to the LSL 502 and the NetWare Operating System. The MSM 504 handles all of the generic initialization and run-time issues common to all drivers. The topology specific module (TSM) 506 manages operations that are unique to a specific media type. The Hardware Specific Modules (HSM) are created by each adapter vendor for each type of adapter 308. The HSM 508 contains the functionality to initialize, reset and shutdown the adapter 308. The HSM 508 also handles packet transmission and reception to and from each adapter 308.

With respect to mass storage device drivers, such as a driver 526, the NetWare Peripheral Architecture (NWPA) 510 is a software architecture developed by Novell which provides an interface for mass storage developers to interface with the NetWare operating system. The NWPA 510 is divided into two components: a host adapter module (HAM) 512 and a custom device module (CDM) 513. The HAM 512 is a component that contains information on the host adapter hardware. The CDM 513 is the component of the NWPA 510 that regulates the mass storage adapters 102.

The main purpose of the Filter CDM 516 is to locate each HAM 512 register for adapter events, and process the I/O suspend and I/O restart requests from the configuration manager 500. These commands are discussed in greater detail in the co-pending U.S. patent application Ser. No. 08/942,309 entitled, "Hot Add of Devices Software Architecture" mentioned above.

A NetWare user interface 518 initiates the requests to the configuration manager 500 to freeze and restart communications to a specified adapter 310. A remote Small Network Management Protocol (SNMP) agent 520 can also start the request to freeze and resume communications to the configuration manager 500 through a local SNMP agent 522. SNMP is a communication protocol used by software designers to facilitate communication among computers on a network. In one embodiment of the invention, the computers would be similar to the server system of FIG. 1 and connected in a server network via connection 132.

FIG. 6 is a flowchart illustrating one process to hot add an adapter 310. For instance, the process shown in FIG. 6 may be utilized by a server system 100 containing the bus structure shown in FIG. 2. The process described by FIG. 6 is generic to various implementations of the invention. The following description of FIG. 6 focuses on the hot add of an adapter 310 under the NetWare Operating System.

Starting in a state 600, a user inserts an adapter 310 into one of the PC bus slots, such as a slot 266 (FIGS. 3 and 4). At this point, the hot plug hardware 312 has not turned on the power to the adapter's slot, although the server system 100 is operational. Since the adapter's slot is not powered, the PC adapter 310 will not be damaged by a short circuit during the insertion process. Moving to a state 602, the hot plug hardware 312 supplies power to the adapter's slot. In one embodiment, the hot plug hardware automatically detects the presence of the newly added adapter 310. In another embodiment, the user notifies the hot plug hardware 312 that the adapter 310 is connected to one of the PC slots 266. The configuration manager 500 then programs the newly added adapter 310 (state 604) by initializing the adapter's registers with appropriate memory, I/O and interrupt parameters, after power to the adapter has been turned on. Once an adapter 310 is added to the computer system, a device driver must be loaded for the adapter 310.

FIG. 7 is a flowchart illustrating one process of hot adding an adapter 310 on one of the canisters 258–264. The process described by FIG. 7 is generic to multiple implementations of hot adding a device. For instance, the process shown in FIG. 7 is utilized by a server system 100 containing the bus structure shown in FIG. 3. The following description of FIG. 7 focuses on the hot add of an adapter 310 on a canister under the NetWare Operating System.

Starting in a state 700, The SNMP agent 520 or the NetWare User Interface 518 initiates the request for the suspension for every adapter, such as the adapter 310, on the canister. For each request the configuration manager 500 suspends the I/O for one of the adapters that is located on one of the canisters 258–264. The configuration manager 500 initiates the suspension of I/O to either the NWPA 510 for the mass storage adapters 102 or the LSL 502 and MSM 504 for the network adapter 104. A further discussion of the process by which the configuration manager 500 suspends and resumes the I/O to a mass storage adapter and to a network adapter is presented in the co-pending U.S. patent application Ser. No. 08/942,309, "Hot Add of Devices Software Architecture" mentioned above.

For hot plug methods and systems that use the PCI architecture, the software must assert the bus reset bit as defined by the PCI specification (state 702). If the power to the canister is on, the hot plug hardware 312 is directed by the configuration manager 500 to disable the power to one of the specified canisters 258–264 (state 704).

Proceeding to state 706, the user inserts an adapter into one of the PC slots 266. If the card is on a new canister that was not present during boot initialization, the hot plug hardware 312 should support the sparse assignment of bus numbers for those systems that require such functionality. The hot plug hardware 312 then restarts the power to the selection canister, e.g., one of the canisters 258–264 (state 708). For PCI systems, the configuration manager 500 de-asserts the bus reset bit (state 710). The configuration manager 500 re-initializes the configuration space of each adapter that was previously in the system (state 712). Since an adapter is non-powered before and during a hot add, the adapter is in an unknown state after receiving power. Moving to a state 714, the configuration manager 500 programs the configuration space of the new adapter. Finally, the configuration manager 500 resumes operations to all of the adapters located on the canister (state 718). For mass storage adapters 102 the configuration manager 500 notifies the NWPA 510 to resume communications. For network adapters 104, the configuration manager 500 contacts the LSL 502 to resume communications.

For further discussion on the operation of hot pluggability and related topics, please refer to co-pending and commonly owned U.S. patent application Ser. No. 08/942,311, entitled "Hot Swap and Add of Devices Software Architecture" as previously mentioned above.

The foregoing briefly describes a method and system of hot adding adapters into a server system and thereafter configuring the adapter. As described above, the adapter configuration process includes updating a configuration space within the adapter with a configuration manager program and programming the adapter's registers with appropriate memory, I/O and interrupt parameters, after power to the adapter has been turned on. One method and system for performing this adapter configuration process is described in further detail in a co-pending and commonly owned U.S. patent application Ser. No. 08/942,268, entitled, "Configuration Management Method For Hot Adding and Hot Replacing Devices," which is listed in Appendix A attached hereto.

However, after the configuration of the adapter is completed, the process does not end there. A system operator must still reconfigure the server system in order to permanently incorporate the new adapter into the system such that it is recognized upon subsequent reboots of the system. As described above under the section entitled "Background of the Invention," prior art methods of reconfiguring the server, after a hot add of a new device, typically require a system operator to manually select and load an appropriate driver for the newly added device, and thereafter, modify start-up configuration files by retrieving the files and inputting appropriate configuration parameters corresponding to the newly added device. If the new device is a LAN card, for example, an additional step of "binding the network protocol" of the device must be performed. The term "binding the network protocol," and its meaning, is well-known in the art. This prior art configuration process can be time-consuming and tedious, especially for a system operator who is not familiar with the configuration requirements of the server as well as the newly added device. In such circumstances, the system operator often makes mistakes in performing one or more of the configuration steps. These mistakes may lead to serious errors in server operation and result in additional downtime of the server.

Figure 8:
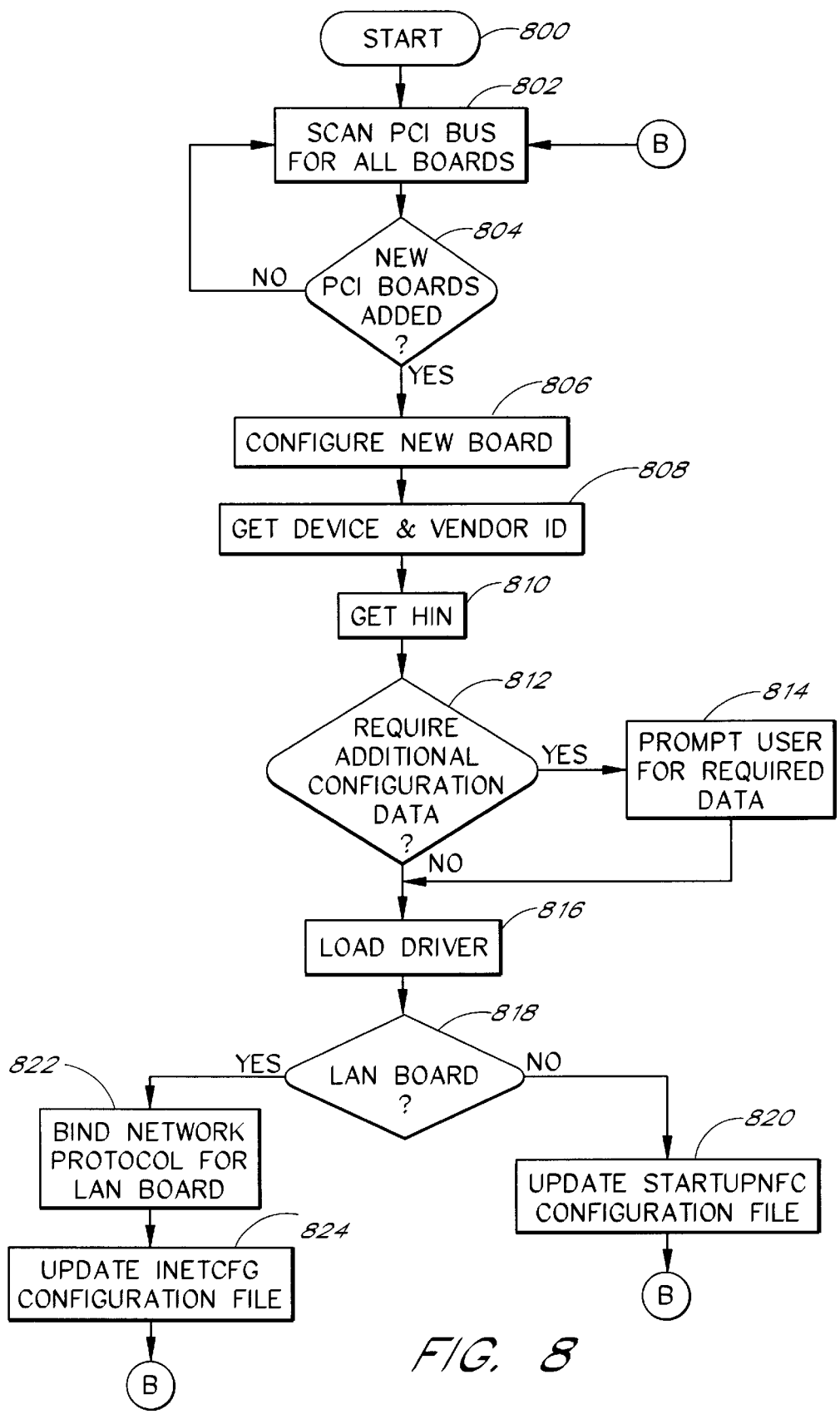
FIG. 8 is a flowchart diagram illustrating one process of automatically configuring a server system so as to integrate a hot added device into the system, in accordance with one embodiment of the invention.

FIG. 8 illustrates a flowchart diagram of one embodiment of a process of automatically configuring a server system after an adapter has been hot added to the server system. The server system may have a bus architecture as shown in either FIG. 2 or FIG. 3. Referring to FIG. 8, the process begins at state 800 and proceeds to state 802, wherein an autoconfiguration software program periodically scans the PCI bus in order to identify all circuit boards on the bus. After each scan, the devices identified are placed in a list and compared against a configuration database kept by the Hot Plug software. In state 804, the program determines, for each scanning operation, whether any new boards have been added to the bus. If a new board or device is detected, as would be the case after a hot add, the new device must be configured. In step 806, the new device is configured. In one embodiment, the detection of the new device initiates the configuration of the device. This process is decribed in further detail below with reference to FIGS. 6 and 7. As described above, the device configuration process entails initializing the device by programming its registers with appropriate address, memory, I/O and interrupt parameters, and thereafter, updating the devices configuration space and applying power to the board.

Next, the server, itself, may be be configured to permanently integrate the device into the system such that it is automatically initialized upon subsequent reboots of the server. In a PCI bus architecture, for example, each device, or board, includes a Device ID and a Vendor ID which is stored in a read only memory (ROM) chip located on the device. In step 808, the autoconfiguration program retrieves the Vendor and Device ID from the device in order to determine whether that device is a SCSI or a LAN device, and who its manufacturer is. Next, in state 810, the program obtains the hardware instance number (HIN) of the device in order to identify the "slot number" of the slot, or port, in which the device has been inserted. This "slot number" is necessary so that a driver, which is subsequently loaded, can address the slot and communicate with the new device.

One type of unique identification number is the hardware instance number (HIN). Operating systems such as Novell Netware create HINs for each device addressable by the network operating system. Under normal circumstances, this number is unique for that particular device in the computer system. By obtaining the HIN of a particular device, the system can determine the expansion slot location of the device within the computer system. This function is carried out by a software program that scans every slot attached to a system bus of the computer system and determines whether any devices having HINs are present. If such a device is present, the software records the current slot number and HIN of the device. Software embodiments can be written in any well known language such as C, Fortran, Basic or Cobol. A further description of a method and system of identifying slot locations by mapping HINs is presented in a co-pending and commonly owned patent application Ser. No. 08/941,412, entitled "Determining Slot Numbers in a Computer", which is listed in Appendix A attached hereto.

Next, in state 812, the program determines whether additional data is required to configure the system. Because the Device ID and Vendor ID of the device is known, the program can determine what additional parameters are required. By looking up a table of configuration requirements for that device, the program generates a finite list of parameters that are required to load an appropriate driver for that device. If it is determined that additional data is required, in state 814, the program announces the detection of the new device and prompts a user to enter the additionally required values. If it is determined that additional data is not required, the program proceeds directly from state 812 to state 816.

In state 816, the program automatically loads the appropriate driver with the additional data collected by the user, if any. In order to permanently configure the system such that the new device is initialized upon subsequent restarts, the program may modify appropriate start-up configuration files. In state 818, the program determines whether the device is a LAN device based on the device ID previously obtained. If it is not a LAN device, the program determines that the device is a SCSI device and proceeds to state 820, wherein it automatically modifies the STARTUP.NCF configuration file. Many processes of automatically modifying a configuration file with the use of software generated commands are well-known in the art. Any of these methods can be utilized in accordance with the invention. The program then loops back to step 802 in which it once again scans for hot added devices.

If the device is a LAN device, the program proceeds to state 822, wherein the program binds the network protocol for the device. The process of "binding the network protocol" of a device is well-known in the art. Next, in step 824, the program modifies the INETCFG configuration file. Many processes of automatically modifying a configuration file with the use of software generated commands are well-known in the art. Any of these methods can be utilized in accordance with the invention. The program then loops back to step 802 in which it once again scans for hot added devices.

As described above, the invention provides a method and system for automatically configuring a server system so as to permanently integrate hot added devices into the system. By sensing a newly added device and automatically initiating a system configuration protocol, one embodiment of the invention eliminates, or reduces, user interaction which is required in current system configuration procedures. By automatically performing the system configuration, one embodiment of the invention expedites the process of hot adding new devices to a server system and further reduces the risk of configuration errors made by the user, leading to an overall reduction in system downtime. Additionally, one embodiment of the invention simplifies the system configuration process by automatically identifying the type of device, its slot location, and thereafter configuring the system based on this information, by loading appropriate drivers, modifying appropriate start-up configuration files, and saving the modified start-up configuration files in the system's main memory.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

APPENDIX A

Incorporation by Reference of Commonly Owned Applications
The following patent applications, commonly owned and
filed October 1, 1997, are hereby incorporated herein
in their entirety by reference thereto:

| Title | Application No. |
| --- | --- |
| "System Architecture for Remote Access and Control of Environmental Management" | 08/942,160 |
| "Method of Remote Access and Control of Environmental Management" | 08/942,215 |
| "System for Independent Powering of Diagnostic Processes on a Computer System" | 08/942,410 |
| "Method of Independent Powering of Diagnostic Processes on a Computer System" | 08/942,320 |
| "Diagnostic and Managing Distributed Processor System" | 08/942,402 |
| "Method for Managing a Distributed Processor System" | 08/942,448 |
| "System for Mapping Environmental Resources to Memory for Program Access" | 08/942,222 |
| "Method for Mapping Environmental Resources to Memory for Program Access" | 08/942,214 |
| "Hot Add of Devices Software" | 08/942,309 |

APPENDIX A-continued

Incorporation by Reference of Commonly Owned Applications
The following patent applications, commonly owned and
filed October 1, 1997, are hereby incorporated herein
in their entirety by reference thereto:

| Title | Application No. |
|---|---|
| Architecture" | |
| "Method for The Hot Add of Devices" | 08/942,306 |
| "Hot Swap of Devices Software Architecture" | 08/942,311 |
| "Method for The Hot Swap of Devices" | 08/942,457 |
| "Method for the Hot Add of a Network Adapter on a System Including a Dynamically Loaded Adapter Driver" | 08/943,072 |
| "Method for the Hot Add of a Mass Storage Adapter on a System Including a Statically Loaded Adapter Driver" | 08/942,069 |
| "Method for the Hot Add of a Network Adapter on a System Including a Statically Loaded Adapter Driver" | 08/942,465 |
| "Method for the Hot Add of a Mass Storage Adapter on a System Including a Dynamically Loaded Adapter Driver" | 08/962,963 |
| "Method for the Hot Swap of a Network Adapter on a System Including a Dynamically Loaded Adapter Driver" | 08/943,078 |
| "Method for the Hot Swap of a Mass Storage Adapter on a System Including a Statically Loaded Adapter Driver" | 08/942,336 |
| "Method for the Hot Swap of a Network Adapter on a System Including a Statically Loaded Adapter Driver" | 08/942,459 |
| "Method for the Hot Swap of a Mass Storage Adapter on a System Including a Dynamically Loaded Adapter Driver" | 08/942,458 |
| "Method of Performing an Extensive Diagnostic Test in Conjunction with a BIOS Test Routine" | 08/942,463 |
| "Apparatus for Performing an Extensive Diagnostic Test in Conjunction with a BIOS Test Routine" | 08/942,163 |
| "Configuration Management Method for Hot Adding and Hot Replacing Devices" | 08/941,268 |
| "Configuration Management System for Hot Adding and Hot Replacing Devices" | 08/942,408 |
| "Apparatus for Interfacing Buses" | 08/942,382 |
| "Method for Interfacing Buses" | 08/942,413 |
| "Computer Fan Speed Control Device" | 08/942,447 |
| "Computer Fan Speed Control Method" | 08/942,216 |
| "System for Powering Up and Powering Down a Server" | 08/943,076 |
| "Method of Powering Up and Powering Down a Server" | 08/943,077 |
| "System for Resetting a Server" | 08/942,333 |
| "Method of Resetting a Server" | 08/942,405 |
| "System for Displaying Flight Recorder" | 08/942,070 |
| "Method of Displaying Flight Recorder" | 08/942,068 |
| "Synchronous Communication Interface" | 08/943,355 |
| "Synchronous Communication Emulation" | 08/942,004 |
| "Software System Facilitating the Replacement or Insertion of Devices in a Computer System" | 08/942,317 |
| "Method for Facilitating the Replacement or Insertion of Devices in a Computer System" | 08/942,316 |
| "System Management Graphical User Interface" | 08/943,357 |
| "Display of System Information" | 08/942,195 |
| "Data Management System Supporting Hot Plug Operations on a Computer" | 08/942,129 |
| "Data Management Method Supporting Hot Plug Operations on a Computer" | 08/942,124 |
| "Alert Configurator and Manager" | 08/942,005 |
| "Managing Computer System Alerts" | 08/943,356 |
| "Computer Fan Speed Control System" | 08/940,301 |
| "Computer Fan Speed Control System Method" | 08/941,267 |
| "Black Box Recorder for Information System Events" | 08/942,381 |
| "Method of Recording Information System Events" | 08/942,164 |
| "Method for Automatically Reporting a System Failure in a Server" | 08/942,168 |
| "System for Automatically Reporting a System Failure in a Server" | 08/942,384 |
| "Expansion of PCI Bus Loading Capacity" | 08/942,404 |
| "Method for Expanding PCI Bus Loading Capacity" | 08/942,223 |
| "System for Displaying System Status" | 08/942,347 |
| "Method of Displaying System Status" | 08/942,071 |
| "Fault Tolerant Computer System" | 08/942,194 |
| "Method for Hot Swapping of Network Components" | 08/943,044 |
| "A Method for Communicating a Software Generated Pulse Waveform Between Two Servers in a Network" | 08/942,221 |
| "A System for Communicating a Software Generated Pulse Waveform Between Two Servers in a Network" | 08/942,409 |
| "Method for Clustering Software Applications" | 08/942,318 |
| "System for Clustering Software Applications" | 08/942,411 |
| "Method for Automatically Configuring a Server after Hot Add of a Device" | 08/942,319 |
| "Method of Automatically Configuring and Formatting a Computer System and Installing Software" | 08/942,412 |
| "System for Automatically Configuring and Formatting a Computer System and Installing Software" | 08/941,955 |
| "Determining Slot Numbers in a Computer" | 08/942,462 |
| "System for Detecting Errors in a Network" | 08/942,169 |
| "Method of Detecting Errors in a Network" | 08/940,302 |
| "System for Detecting Network Errors" | 08/942,407 |
| "Method of Detecting Network Errors" | 08/942,573 |

What is claimed is:

1. A system for automatically configuring an operating computer system, comprising:

a bus system having a plurality of bus slots;

hot plug hardware for enabling and disabling the supply of power to selected ones of the bus slots;

a detection module which automatically detects a PCI device in response to the PCI device being connected to a selected one of the bus slots that has a disabled power supply, and wherein the hot plug hardware enables the supply of power to the hot added PCI device in response to the detection of the hot added PCI device by the detection module;

a first configuration module which automatically configures the PCI device;

an identification module which automatically identifies a device type for the PCI device;

a location module which automatically determines the location where the PCI device has been hot added;

a driver module which automatically loads a driver corresponding to the PCI device; and a second configuration module which automatically modifies a configuration file so as to integrate the PCI device into the system, wherein the second configuration module comprises a LAN module which determines whether the hot added device is local area network (LAN) device, wherein, if it is determined that the hot added device is not a LAN device, the LAN module modifies a first configuration file, and if it is determined that the hot added device is a LAN device, the LAN module modifies a second configuration file.

2. The system of claim 1 wherein the detection module comprises:
a first scanning module which scans a system bus in order to identify all devices connected to the bus; and
a compare module which compares a list of identified devices to a configuration database, wherein a new device is indicated if it is identified in the list but not in the configuration database.

3. The system of claim 2 wherein the identification module comprises a vendor module which retrieves a Device ID and Vendor ID from the device.

4. The system of claim 3 wherein the location module comprises:
a second scanning module which scans all slots connected to the system bus for any devices which have a hardware instance number (HIN), wherein each slot has a specified slot number;
a HIN module which obtains a hardware instance number (HIN) from the hot added device; and
a recording module which records a slot number and the hardware instance number corresponding to the device.

5. The system of claim 1 further comprising a data module which determines if additional data is required to configure the system, wherein, if it is determined that additional data is required, the data module prompts a system operator for the additional data.

6. The system of claim 5 wherein the data module comprises:
a table module which reviews a table of configuration parameters for the device type; and
a parameter module which generates a list of parameters required to load a driver for the device.

7. The system of claim 1 wherein the identification module comprises a vendor module which retrieves a Device ID and Vendor ID from the device.

8. The system of claim 1 wherein the detection module comprises:
a first scanning module which scans a system bus in order to identify all devices connected to the bus; and
a compare module which compares a list of identified devices to a configuration database, wherein a new device is indicated if it is identified in the list but not in the configuration database.

9. The system of claim 1 wherein the location module comprises:
a second scanning module which scans all slots connected to a system bus for any devices which have hardware instance number (HIN) wherein each slot has a specified slot number;
a HIN module which obtains a hardware instance number (HIN) from the hot added device; and
a recording module which records a slot number corresponding to each device having a HIN.

10. The system of claim 1 wherein the configuration module comprises a LAN module which determines whether the hot added device is local area network (LAN) device, wherein, if it is determined that the hot added device is not a LAN device, the LAN module modifies a first configuration file, and if it is determined that the hot added device is a LAN device, the LAN module modifies a second configuration file.

11. The system of claim 1 further comprising a data module which determines if additional data is required to configure the system, wherein, if it is determined that additional data is required, the data module prompts a system operator for the additional data.

12. The system of claim 11 wherein the data module comprises:
a table module which reviews a table of configuration parameters for the device type;
a parameter list module which generates a list of parameters required to load a driver for the device; and
a second compare module which compares the list of parameters with presently available data about the device.

13. A system of automatically configuring a server system after a device has been hot added to the system, comprising:
a first scanning module which scans a system bus in order to identify all devices connected to the bus;
a compare module which compares a list of identified devices to a configuration database, wherein a new device is indicated if it is identified in the list but not in the configuration database;
a first configuration module which configures the device;
a vendor module which retrieves a Device ID and Vendor ID from the device so as to identify the type of device;
a second scanning module which scans the system bus for any devices which have a hardware instance number (HIN);
a HIN module which obtains a hardware instance number (HIN) from the hot added device;
a recording module which records a slot number and the hardware instance number of the device;
a driver module which loads a driver corresponding to the hot added device;
a LAN module which determines whether the hot added device is local area network (LAN) device; and
a second configuration module which modifies a configuration file, wherein, if it is determined that the hot added device is not a LAN device, a first configuration file is modified, and if it is determined that the hot added device is a LAN device, a second configuration file is modified.

14. The system of claim 13 further comprising:
a data module which determines if additional data is required to configure the system; and
a prompt module which prompts a system operator for additional data, if it is determined that additional data is required.

15. The system of claim 14 wherein the data module comprises:
a table module which reviews a table of configuration parameters for the device type corresponding to the hot added device; and
a parameter module which generates a list of parameters required to load a driver for the device.

16. A system for automatically configuring an operating computer system, comprising:
means for receiving a PCI device;
means for enabling and disabling a supply of power to the PCI device;
means for automatically detecting the PCI device;
means for automatically configuring the PCI device;
means for automatically identifying the type of the PCI device;

means for automatically determining the location where the PCI device has been added;

means for automatically loading a driver corresponding to the PCI device; and means for automatically modifying a configuration file so as to integrate the PCI device into the system, wherein the means for automatically modifying a configuration file comprises means for determining whether the hot added device is local area network (LAN) device, wherein, if it is determined that the hot added device is not a LAN device, a first configuration file is modified and if it is determined that the hot added device is a LAN device, a second configuration file is modified.

17. The system of claim 16 wherein the act of automatically detecting the hot added device comprises:

means for scanning a system bus in order to identify all devices connected to the bus; and means for comparing a list of identified devices to a configuration database, wherein a new device is indicated if it is identified in the list but not in the configuration database.

18. The system of claim 17 further comprising means for initiating the automatic configuration of the device upon the detection of the hot added device.

19. The system of claim 18 wherein the means for automatically identifying the device type comprises means for retrieving a Device ID and Vendor ID from the device.

20. The system of claim 19 wherein the means for automatically determining the location where the device has been hot added comprises:

means for scanning the system bus for any devices which have a hardware instance number (HIN);

means for obtaining a hardware instance number (HIN) from the hot added device; and means for recording a slot number and the hardware instance number of the device.

21. The system of claim 16 further comprising:

means for determining if additional data is required to configure the system; and means for prompting a system operator for the additional data, if it is determined that additional data is required.

22. The system of claim 21 wherein the means for determining if additional data is required comprises:

means for reviewing a table of configuration parameters for the type of device; and means for generating a list of parameters required to load a driver for the device.

23. The system of claim 16 wherein the means for automatically identifying the device type comprises means for retrieving a Device ID and Vendor ID from the device.

24. The system of claim 16 wherein the means for automatically determining the location where the device has been hot added comprises:

means for scanning a system bus for any devices which have a hardware instance number (HIN);

means for obtaining a hardware instance number (HIN) from the hot added device; and means for recording a slot number and the hardware instance number of the device.

25. The system of claim 16 wherein the means for automatically modifying a configuration file comprises means for determining whether the hot added device is local area network (LAN) device, wherein, if it is determined that the hot added device is not a LAN device, a first configuration file is modified, and if it is determined that the hot added device is a LAN device, a second configuration file is modified.

26. The system of claim 25 wherein the means for determining whether the hot added device is a LAN device comprises means for retrieving a Device ID and Vendor ID from the device.

27. The system of claim 16 further comprising:

means for determining if additional data is required to configure the system; and means for prompting a system operator for the additional data, if it is determined that additional data is required.

28. The system of claim 27 wherein the means for determining if additional data is required comprises:

means for reviewing a table of configuration parameters for the device type; and means for generating a list of parameters required to load a driver for the device.

29. A system of automatically configuring a server system after a device has been hot added to the system, comprising:

means for scanning a system bus in order to identify all devices connected to the bus;

means for comparing a list of identified devices to a configuration database, wherein a new device is indicated if it is identified in the list but not in the configuration database;

means for configuring the device;

means for retrieving a Device ID and Vendor ID from the device so as to identify a device type;

means for scanning the system bus for any devices which have a hardware instance number (HIN);

means for obtaining a hardware instance number (HIN) from the hot added device;

means for recording a slot number and the hardware instance number of the device;

means for loading a driver corresponding to the hot added device;

means for determining whether the hot added device is local area network (LAN) device; and means for configuring the server so as to integrate the hot added device into the server system, wherein if it is determined that the hot added device is not a LAN device, a first configuration file is modified, and if it is determined that the hot added device is a LAN device, a second configuration file is modified.

30. The system of claim 29 further comprising:

means for determining if additional data is required to configure the system; and means for prompting a system operator for the additional data, if it is determined that additional data is required.

31. The system of claim 30 wherein the means for determining if additional data is required comprises:

means for reviewing a table of configuration parameters for the device type; and means for generating a list of parameters required to load a driver for the device.

32. A program storage device which stores instructions that when executed by a computer perform a method which comprises:

automatically detecting a PCI device;

automatically providing, in response to detecting the PCI device, a supply of power to the PCI device;

automatically configuring the PCI device;

automatically identifying a device type for the PCI device;

automatically determining the location where the PCI device has been added;

automatically loading a driver corresponding to the PCI device; and automatically modifying a configuration file so as to integrate the PCI device into the system, wherein the act of automatically modifying a configuration file comprises:

determining whether the hot added device is local area network (LAN) device;

if it is determined that the hot added device is not a LAN device, modifying a first configuration file; and if it is determined that the hot added device is a LAN device, binding a network protocol of the device and modifying a second configuration file.

33. The device of claim 32 wherein the act of automatically detecting the hot added device comprises:

scanning a system bus in order to identify all devices connected to the bus; and comparing a list of identified devices to a configuration database, wherein a new device is indicated if it is identified in the list but not in the configuration database.

34. The device of claim 33 wherein the detection of the hot added device initiates the automatic configuration of the device.

35. The device of claim 34 wherein the act of automatically identifying a device type for the device comprises retrieving a Device ID and Vendor ID from the device.

36. The device of claim 35 wherein the act of automatically determining the location where the device has been hot added comprises:

scanning the system bus for any devices which have a hardware instance number (HIN);

obtaining a hardware instance number (HIN) from the hot added device; and recording a slot number and the hardware instance number corresponding to the device.

37. The device of claim 36 wherein the method further comprises:

determining if additional data is required to configure the system; and if it is determined that additional data is required, prompting a system operator for the additional data.

38. The device of claim 37 wherein the act of determining if additional data is required comprises:

reviewing a table of configuration parameters for the device type; and generating a list of parameters required to load a driver for the device type.

39. The device of claim 32 wherein the act of automatically identifying the device type comprises retrieving a Device ID and Vendor ID from the device.

40. The device of claim 32 wherein the act of automatically determining the location where the device has been hot added comprises:

scanning a system bus for any devices which have a hardware instance number (HIN);

obtaining a hardware instance number (HIN) from the hot added device; and recording a slot number and the hardware instance number of the device.

41. The device of claim 32 wherein the act of automatically modifying a configuration file comprises:

determining whether the hot added device is local area network (LAN) device;

if it is determined that the hot added device is not a LAN device, modifying a first configuration file; and if it is determined that the hot added device is a LAN device, modifying a second configuration file.

42. The device of claim 41 wherein the act of determining whether the hot added device is a LAN device comprises retrieving a Device ID and Vendor ID from the device.

43. The device of claim 32 wherein the method further comprises:

determining if additional data is required to configure the system; and if it is determined that additional data is required, prompting a system operator for the additional data.

44. The device of claim 43 wherein the act of determining if additional data is required comprises:

reviewing a table of configuration parameters for the device type; and generating a list of parameters required to load a driver for the device.

45. A program storage device which stores instructions that when executed by a computer perform a method of automatically configuring a server system after a device has been hot added to the system, wherein the method comprises:

scanning a system bus in order to identify all devices connected to the bus;

comparing a list of identified devices to a configuration database, wherein a new device is indicated if it is identified in the list but not in the configuration database;

configuring the device;

retrieving a Device ID and Vendor ID from the device so as to identify the type of device;

scanning the system bus for any devices which have a hardware instance number (HIN);

obtaining a hardware instance number (HIN) from the hot added device;

recording a slot number and the hardware instance number of the device;

loading a driver corresponding to the hot added device;

determining whether the hot added device is local area network (LAN) device;

if it is determined that the hot added device is not a LAN device, modifying a first configuration file; and if it is determined that the hot added device is a LAN device, binding a network protocol of the device and modifying a second configuration file.

46. The device of claim 45 wherein the method further comprises:

determining if additional data is required to configure the system; and if it is determined that additional data is required, prompting a system operator for the additional data.

47. The device of claim 46 wherein the act of determining if additional data is required comprises:

reviewing a table of configuration parameters for the device type; and generating a list of parameters required to load a driver for the device.

* * * * *